United States Patent
Ikematsu

(12) 
(10) Patent No.: US 6,731,636 B1
(45) Date of Patent: May 4, 2004

(54) SCHEDULER USING SMALL SIZED SHUFFLE PATTERN IN ATM NETWORK

(75) Inventor: Ryuichi Ikematsu, Tokyo (JP)

(73) Assignee: NEC Corporation, Tokyo (JP)

(*) Notice: Subject to any disclaimer, the term of this patent is extended or adjusted under 35 U.S.C. 154(b) by 744 days.

(21) Appl. No.: 09/676,815

(22) Filed: Oct. 2, 2000

(30) Foreign Application Priority Data

Oct. 4, 1999 (JP) .......................................... 11-282358

(51) Int. Cl.$^7$ .............................................. H04L 12/28
(52) U.S. Cl. ................. 370/395.1; 370/229; 370/395.2; 370/395.4
(58) Field of Search ................................ 370/229, 230, 370/230.1, 231, 351–356, 395.2, 395.21, 395.4, 428, 429, 398, 396, 386, 389, 387, 388, 392, 412, 413, 422, 474

(56) References Cited

U.S. PATENT DOCUMENTS

| | | | | |
|---|---|---|---|---|
| 5,436,886 A | * | 7/1995 | McGill | 370/219 |
| 5,687,172 A | * | 11/1997 | Cloonan et al. | 370/395.71 |
| 5,724,352 A | * | 3/1998 | Cloonan et al. | 370/388 |
| 6,335,934 B1 | * | 1/2002 | Sakurai et al. | 370/355 |
| 6,473,428 B1 | * | 10/2002 | Nichols et al. | 370/395.1 |
| 6,580,714 B1 | * | 6/2003 | Nishizaki et al. | 370/395.1 |
| 6,628,614 B2 | * | 9/2003 | Okuyama et al. | 370/230.1 |
| 2002/0110127 A1 | * | 8/2002 | Uchida | 370/395.1 |

FOREIGN PATENT DOCUMENTS

JP        9-326828        12/1997

* cited by examiner

*Primary Examiner*—Ajit Patel
(74) *Attorney, Agent, or Firm*—Young & Thompson

(57) ABSTRACT

In a scheduler having m input interfaces and n output interfaces in an ATM switching apparatus, each of m and n is an integer equal to or more than 2. The scheduler is includes a storage unit, first and second rearranging unit, a control unit and a searching unit. The storage unit stores a plurality of shuffle patterns including first to fourth shuffle patterns. The first rearranging unit carries out a first shuffling operation in units of k data (k is an integer equal to or more than 2 and less than or equal to s which is one of n and m, the other being t) and a second shuffling operation in units of u groups (u is an integer equal to or more than 2 and corresponding to s/k) to (m×n) data supplied from the m input interfaces based on the first and second shuffle patterns to produce first rearranged data. The (m×n) data are grouped into (t×u) groups. The second rearranging unit carries out a third shuffling operation in units of p data (p is an integer equal to or more than 2 and less than or equal to (m×n)) and a fourth shuffling operation in units of groups to the first rearranged data based on the third and fourth shuffle patterns to produce second rearranged data. The first rearranged data are grouped into v groups (v is an integer equal to or more than 2 and corresponding to (m×n)/p).

22 Claims, 11 Drawing Sheets

Fig.2 PRIOR ART
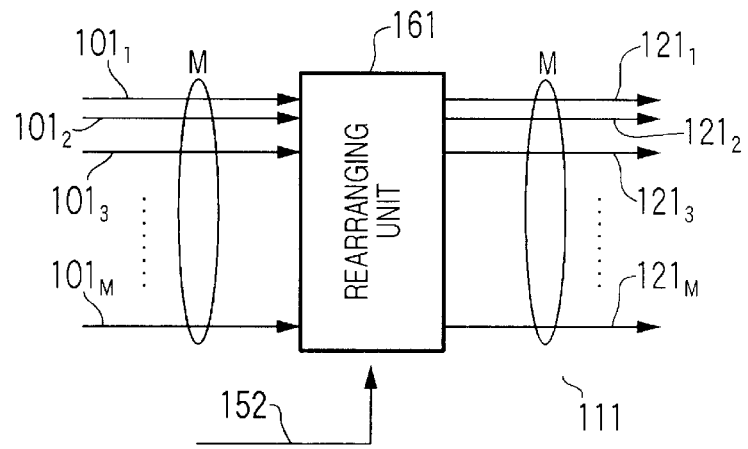
Fig.3 PRIOR ART
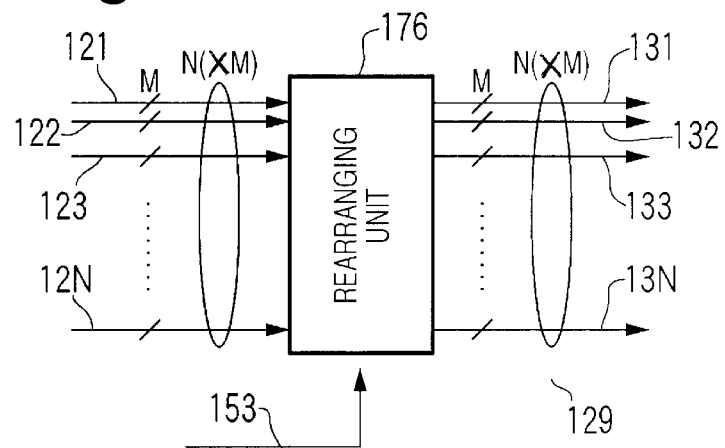
Fig.4 PRIOR ART
| No. | High<-------->Low | | | | | | | | | | |
|---|---|---|---|---|---|---|---|---|---|---|---|
| 1 | 1 | 3 | 5 | 7 | 9 | 11 | 12 | 10 | 8 | 6 | 4 | 2 |
| 2 | 1 | 2 | 3 | 4 | 5 | 6 | 7 | 9 | 10 | 11 | 12 | 8 |
| 3 | 12 | 1 | 11 | 2 | 10 | 3 | 9 | 4 | 8 | 5 | 7 | 6 |
| ⋮ | | | | | ⋮ | | | | | | |
| X | 3 | 6 | 12 | 9 | 8 | 1 | 2 | 7 | 10 | 11 | 5 | 4 |

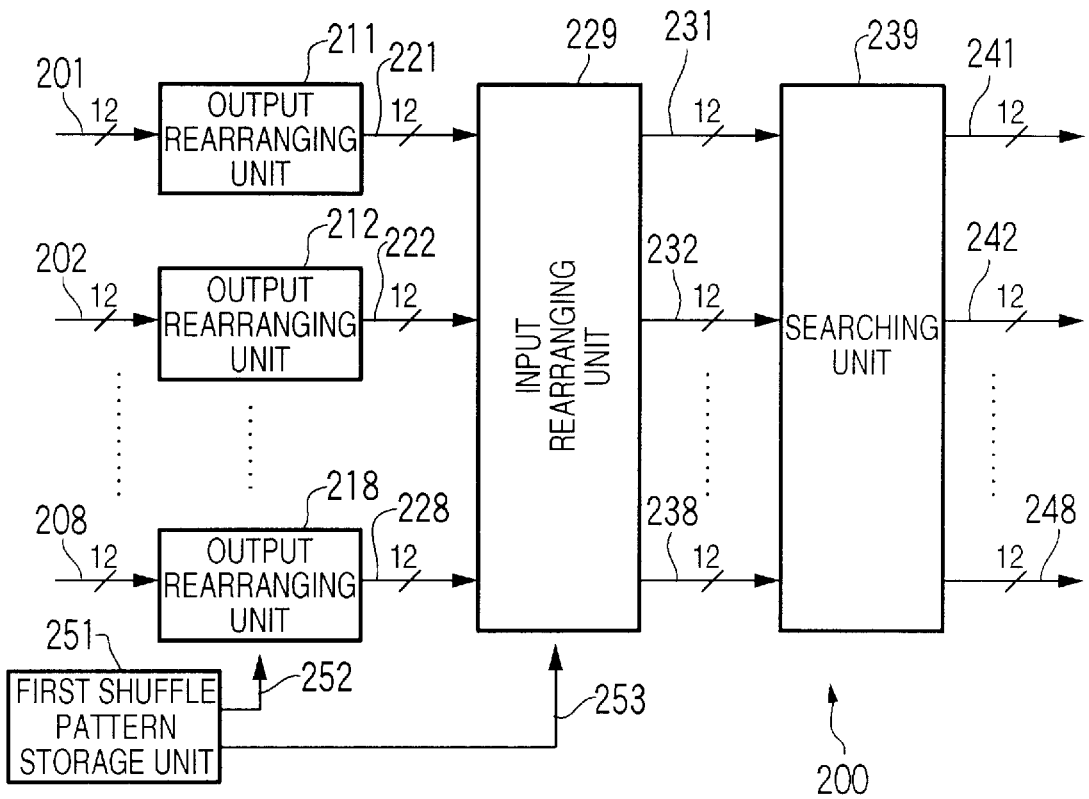

(FIRST SHUFFLE PATTERN STORAGE UNIT) 251

| No. | High<------->Low | | | |
|---|---|---|---|---|
| 1 | 3 | 4 | 2 | 1 |
| 2 | 1 | 3 | 2 | 4 |
| 3 | 4 | 2 | 1 | 3 |
| 4 | 2 | 4 | 1 | 3 |
| ⋮ | ⋮ | ⋮ | ⋮ | ⋮ |
| 24 | 3 | 4 | 1 | 2 |

Fig.11

(SECOND SHUFFLE PATTERN STORAGE UNIT) 268

| No. | High<------>Low | | |
|---|---|---|---|
| 1 | 1 | 2 | 3 |
| 2 | 1 | 3 | 2 |
| 3 | 2 | 1 | 3 |
| 4 | 2 | 3 | 1 |
| 5 | 3 | 1 | 2 |
| 6 | 3 | 2 | 1 |

Fig.12

(THIRD SHUFFLE PATTERN STORAGE UNIT)
278

| No. | High<------>Low | |
|---|---|---|
| 1 | 1 | 2 |
| 2 | 2 | 1 |

Fig.13A
BEFORE REARRANGEMENT

INPUT INTERFACE

| FIRST GROUP | | | | SECOND GROUP | | | |
|---|---|---|---|---|---|---|---|
| 1 | 2 | 3 | 4 | 5 | 6 | 7 | 8 |

Fig.13B
AFTER REARRANGEMENT IN OUTPUT GROUP

| FIRST GROUP | | | | SECOND GROUP | | | |
|---|---|---|---|---|---|---|---|
| 1 | 2 | 3 | 4 | 5 | 6 | 7 | 8 |

Fig.13C
AFTER REARRANGEMENT BETWEEN OUTPUT GROUPS

| FIRST GROUP | | | | SECOND GROUP | | | |
|---|---|---|---|---|---|---|---|
| 1 | 2 | 3 | 4 | 5 | 6 | 7 | 8 |

Fig.13D
AFTER REARRANGEMENT IN INPUT GROUP

| FIRST GROUP | | | | SECOND GROUP | | | |
|---|---|---|---|---|---|---|---|
| 2 | 4 | 1 | 3 | 6 | 8 | 5 | 7 |

Fig.13E
AFTER REARRANGEMENT BETWEEN INPUT GROUPS

| SECOND GROUP | | | | FIRST GROUP | | | |
|---|---|---|---|---|---|---|---|
| 6 | 8 | 5 | 7 | 2 | 4 | 1 | 3 |

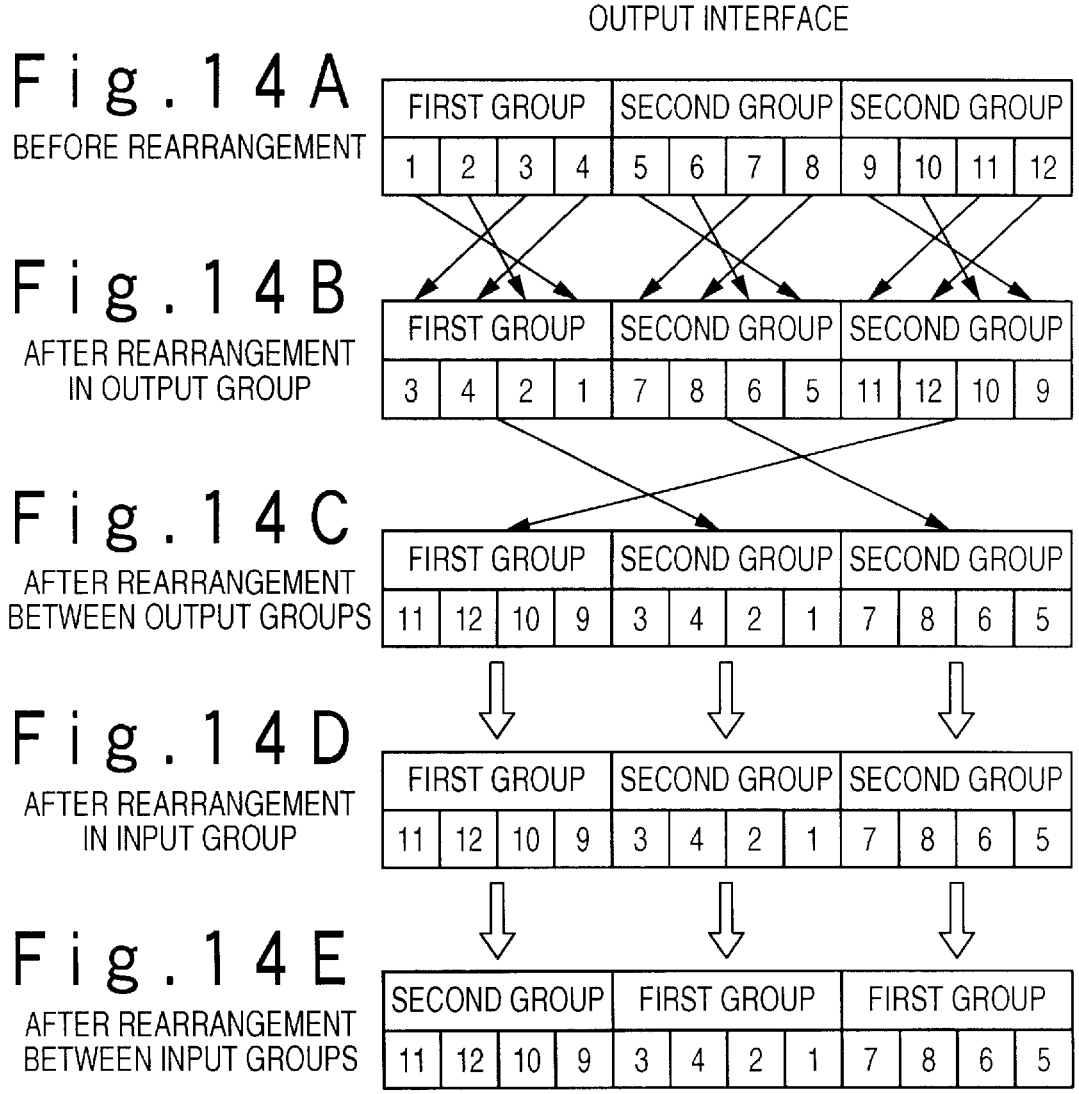

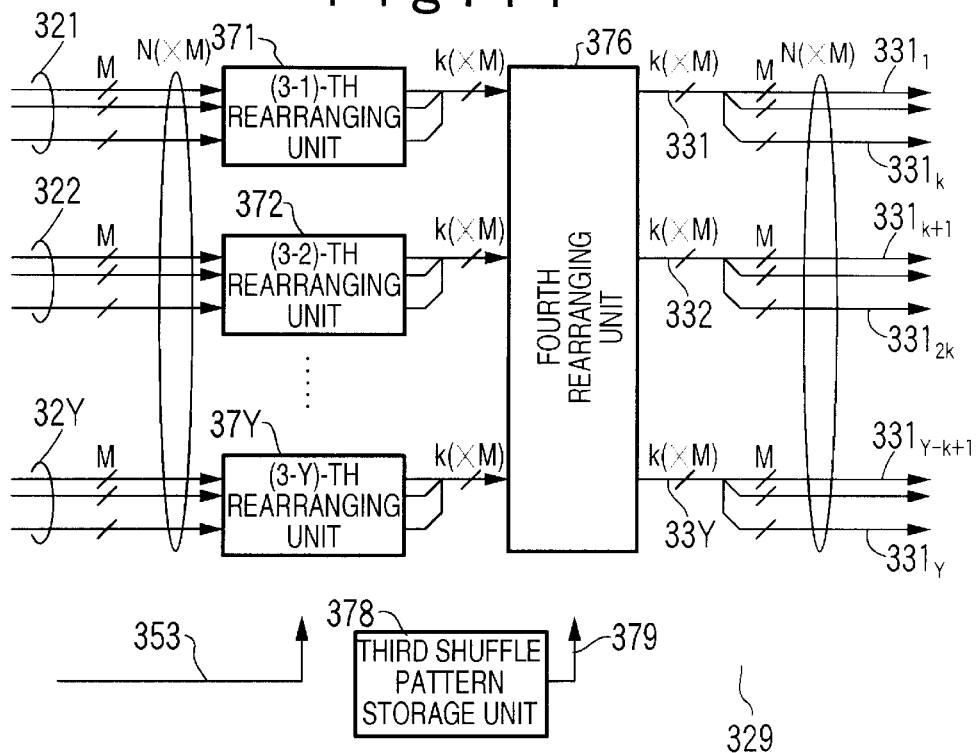
Fig. 17
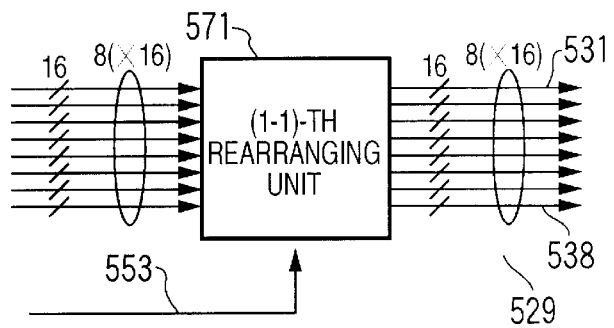
Fig. 18
| No. | High<------->Low | | |
|---|---|---|---|
| 1 | 1 | 2 | 3 |
| 2 | 2 | 1 | 3 |
| 3 | 1 | 3 | 2 |
| 4 | 3 | 2 | 1 |
Fig. 21

US 6,731,636 B1

SCHEDULER USING SMALL SIZED SHUFFLE PATTERN IN ATM NETWORK

BACKGROUND OF THE INVENTION

1. Field of the Invention

The present invention relates to a scheduler, and more particularly to a scheduler for a switching apparatus in an ATM network.

2. Description of the Related Art

Generally, when data on N (N is a positive integer equal to or more than 2) input paths should be fairly allocated to M (M is a positive integer equal to or more than 2) output paths, a scheduler uses shuffle patterns.

FIG. 1 shows the overview of the structure of the scheduler proposed in a conventional example. A similar technique is disclosed in Japanese Laid Open Patent Application (JP-A-Heisei 9-326828). The scheduler 100 is used in a crossbar switch of a packet switching apparatus, and has N input interfaces and M output interfaces (both not shown). The scheduler 100 allocates request data 101 to 10N for allocation request outputted from the first to N-th input interfaces M by M to the first to M-th output interfaces.

The scheduler 100 is composed of first to N-th output rearranging units 111 to 11N, input rearranging unit 129, a searching unit 139, and a shuffle pattern storage unit 151. The first to N-th output rearranging units 111 to 11N input N sets of M request data 101 to 10N outputted from the input interface units, respectively. The input rearranging unit 129 inputs N sets of M rearranged request data 121 to 12N from the first to N-th output rearranging units 111 to 11N. The N sets of M rearranged request data 131 to 13N outputted from the input rearranging unit 129 are supplied to the searching unit 139. The searching unit 139 outputs N permission signals 141 to 14N. The shuffle pattern storage unit 151 is provided for the scheduler 100 to store shuffle patterns for rearrangement of the request data. One 152 of the shuffle patterns is outputted from the shuffle pattern storage unit 151 to the first to N-th output rearranging units 111 to 11N, and is used for the rearrangement of the N sets of M request data 101 to 10N. Also, the other shuffle pattern 153 is outputted from the shuffle pattern storage unit 151 to the input rearranging unit 129, and is used for the rearrangement of the rearranged request data.

FIG. 2 shows a specific structure of the first output rearranging unit 111 in the conventional scheduler. The first to N-th output rearranging units 111 to 11N have the same structure. Therefore, the structure of the first output rearranging unit 111 will be described. The first output rearranging unit 111 is composed of a single rearranging unit 161 which inputs M request data 1011 to 101M. The Shuffle pattern 152 is supplied to the rearranging unit 161 from the shuffle pattern storage unit 151 shown in FIG. 1. The rearrangement of the M request data 1011 to 101M is carried out once in accordance with the shuffle pattern 152. The M rearranged request data 1211 to 121M are supplied to the input rearranging unit 129 shown in FIG. 1.

FIG. 3 shows a specific structure of the input rearranging unit of the scheduler 100 shown in FIG. 1. The input rearranging unit 129 is composed of a rearranging unit 176, which inputs N sets of M rearranged request data 121 to 12N. The shuffle pattern 153 is supplied from the shuffle pattern storage unit 151 shown in FIG. 1 to the rearranging unit 176. The rearrangement of the rearranged request data 121 to 12N is carried out once in accordance with the shuffle pattern 153. The rearranged request data 131 to 13N are supplied to the searching unit 139 shown in FIG. 1.

By the way, the rearrangement of the request data is carried out once in the rearranging units 161 and 176 shown in FIGS. 2 and FIG. 3, respectively. In such a conventional example, when the number of input paths is M which is different from the number of output paths N, the shuffle patterns need to be prepared individually. This will be described below.

FIG. 4 shows an example of the shuffle pattern used to rearrange twelve data. Only a part of such a shuffle pattern cannot be used for eight data which are less than twelve data. This will be further described. In the shuffle pattern for the twelve data shown in FIG. 4, values from "1" to "12" are randomly arranged in order of the access. At this time, it is supposed that eight shuffle data are fixedly taken out from the shuffle pattern shown in FIG. 4. In this case, it is necessary to contain all the values from "1" to "8" in eight shuffle data. However, it is impossible for the taken data to contain all the values from "1" to "8". Therefore, the shuffle patterns need to be independently prepared depending on the size of data.

Now, the case that the value M is "8" and the value N is "12" will be described as an example. When the scheduling operation of 8×12 is carried out, the number of shuffle patterns used to rearrange eight data is "40,320" as factorial of eight for all the patterns of arrangement, because the amount of information is 24 bits. Also, in case of twelve data, one set of shuffle patterns is 48 bits, and the number of shuffle patterns is "479,001,600" as factorial of twelve. Therefore, the memory with the memory capacity of 40,320 words×24 bits and the memory with the memory capacity of 479,001,600 word×48 bits need be prepared. Also, when access to the memories is carried out using a bus of eight bits, the memory access is carried out three times to read the shuffle pattern for eight data and six times to read the shuffle pattern for twelve data.

It could be considered that these two memories are accessed in parallel to reduce the access time. However, when such parallel access is carried out, it is necessary to prepare two sets of interface signals such as address signals and data control signal to access these two memories. Therefore, when the scheduler is realized as an integrated circuit such as LSI and FPGA, there would be a case that the number of terminals lacks.

In conjunction with the above description, the above Japanese Laid Open Patent Application (JP-A-Heisei 9-326828) corresponding to U.S. patent application Ser. No. 08/656,546 discloses a data packet router. In this reference, a data array having the number of data elements corresponding to the number of switch elements is provided in correspondence with a switch element matrix. First and second pseudo random shuffle patterns are generated to each of a series of intervals of connections of data sources and data destinations. The data sources are allocated to the data elements in accordance with the first current pseudo random shuffle pattern. The data destinations are allocated to the data elements in accordance with the second current pseudo random shuffle pattern. An increment test is carried out for the sources and the destinations over the data array to search a matching of a not-allocated source to the destination. The matching is allocated to the switch element corresponding to the data element. In this case, the first shuffle pattern is biased for the data source having the first priority level higher than a second priority level to be positioned near the start point of the increment test. After the whole data array is tested, the switch element is operated for the subsequent interval in accordance with the allocation for the current interval.

SUMMARY OF THE INVENTION

Therefore, an object of the present invention is to provide a scheduler in which the memory capacity of a memory for storing shuffle patterns can be reduced.

Another object of the present invention is to provide a scheduler in which a shuffling operation can be carried out when data with the number of input paths M is different from the number of output paths N.

Still another object of the present invention is to provide a scheduler in which a shuffling operation can be carried out for input paths or output paths with different priority levels.

In order to achieve an aspect of the present invention, in a scheduler having m input interfaces and n output interfaces in an ATM switching apparatus, each of m and n is an integer equal to or more than 2. The scheduler is includes a storage unit, first and second rearranging unit, a control unit and a searching unit. The storage unit stores a plurality of shuffle patterns including first to fourth shuffle patterns. The first rearranging unit carries out a first shuffling operation in units of k data (k is an integer equal to or more than 2 and less than or equal to s which is one of n and m, the other being t) and a second shuffling operation in units of u groups (u is an integer equal to or more than 2 and corresponding to s/k) to (m×n) data supplied from the m input interfaces based on the first and second shuffle patterns to produce first rearranged data. The (m×n) data are grouped into (t×u) groups. The second rearranging unit carries out a third shuffling operation in units of p data (p is an integer equal to or more than 2 and less than or equal to (m×n)) and a fourth shuffling operation in units of groups to the first rearranged data based on the third and fourth shuffle patterns to produce second rearranged data. The first rearranged data are grouped into v groups (v is an integer equal to or more than 2 and corresponding to (m×n)/p). The control unit reads out the first to fourth shuffle patterns to supply to the first and second rearranging units. The searching unit outputs a permission signal for a relation between one input interface and one output interface based on the second rearranged data and a predetermined algorithm.

In this case, it is desirable that the storage unit includes a plurality of memories, which stores the plurality of shuffle patterns in units of sizes of the plurality of shuffle patterns.

Also, the first rearranging unit may include (t×u) rearranging units and t third rearranging units. Each of the (t×u) rearranging units carries out the first shuffling operation to corresponding ones of the (m×n) data based on the first shuffle pattern to produce third rearranged data. Each of the t third rearranging units is provided for u of the (t×u) rearranging units to carry out the second shuffling operation to corresponding u groups of the third rearranged data based on the second shuffle pattern to produce (the first rearranged data)/t.

Alternatively, each of the t third rearranging units is provided to carry out the second shuffling operation to corresponding u groups of the (t×u) groups based on the second shuffle pattern to produce fourth rearranged data. Each of the (t×u) rearranging units carries out the first shuffling operation to corresponding one of (the fourth rearranged data)/u based on the first shuffle pattern to produce (the first rearranged data)/(t×u).

Also, the second rearranging unit may include v fifth rearranging units, and a sixth rearranging unit. Each of the v fifth rearranging units carries out the third shuffling operation to corresponding p data of the first rearranged data based on the third shuffle pattern to produce fifth rearranged data. The sixth rearranging unit carries out the fourth shuffling operation to the v fifth rearranged data based on the fourth shuffle pattern to produce the second rearranged data.

Alternatively, the sixth rearranging unit carries out the fourth shuffling operation to the first rearranged data based on the fourth shuffle pattern to produce the sixth rearranged data. Each of the v fifth rearranging units carries out the third shuffling operation to corresponding data of (the sixth rearranged data)/v based on the third shuffle pattern to produce (the second rearranged data)/v.

Also, the control unit may allocate ones selected in a same probability from among the plurality of shuffle patterns stored in the storage unit based on the number of data to be rearranged as the first to fourth shuffle patterns.

Also, each of the plurality of shuffle patterns has a priority level, and the control allocates ones selected in a specified probability from among the plurality of shuffle patterns based on the number of data to be rearranged as the first to fourth shuffle patterns.

Also, it is desirable that k is a common divisor of m and n. Also, it is desirable that when s is not a common multiple of k, dummy data are added to one of the u groups such that the number of data in the one group is equal to k.

In order to achieve another aspect of the present invention, there is provided a method of shuffling (m×n) in a scheduler having m input interfaces and n output interfaces, each of m and n being an integer equal to or more than 2. The method is attained by (a) carrying out a first shuffling operation in units of k data (k is an integer equal to or more than 2 and less than or equal to s which is one of n and m, the other being t) and a second shuffling operation in units of u groups (u is an integer equal to or more than 2 and corresponding to s/k) to (m×n) data supplied from the m input interfaces based on the first and second shuffle patterns to produce first rearranged data, the (m×n) data being grouped into (t×u) groups, by (b) carrying out a third shuffling operation in units of p data (p is an integer equal to or more than 2 and less than or equal to (m×n)) and a fourth shuffling operation in units of groups to the first rearranged data based on the third and fourth shuffle patterns to produce second rearranged data, the first rearranged data being grouped into v groups (v is an integer equal to or more than 2 and corresponding to (m×n)/p), and by outputting a permission signal for a relation between one input interface and one output interface based on the second rearranged data and a predetermined algorithm.

Also, a plurality of shuffle patterns are stored in units of sizes of the plurality of shuffle patterns.

Also, the (a) carrying out may be attained by (c) carrying out the first shuffling operation to the (m×n) data in units of k data based on the first shuffle pattern to produce a third rearranged data; and (d) carrying out the second shuffling operation to the third rearranged data in units of u groups based on the second shuffle pattern to produce the first rearranged data.

Alternatively, the (a) carrying out may be attained by (e) carrying out the second shuffling operation to the (m×n) data in units of u groups based on the second shuffle pattern to produce the fourth rearranged data; and by (f) carrying out the first shuffling operation to the fourth rearranged data in units of k data based on the first shuffle pattern to produce the first rearranged data.

Also, the (b) carrying out may be attained by (g) carrying out the third shuffling operation to the first rearranged data in units of p data based on the third shuffle pattern to produce fifth rearranged data; and by (h) carrying out the fourth shuffling operation to the fifth rearranged data based on the fourth shuffle pattern to produce the second rearranged data.

Alternatively, the (b) carrying out may be attained by (i) carrying out the fourth shuffling operation to the first rearranged data in units of groups based on the fourth shuffle pattern to produce sixth rearranged data; and by (j) carrying out the third shuffling operation to the sixth rearranged data in units of p data based on the third shuffle pattern to produce the second rearranged data.

Also, the first to fourth shuffle patterns may be selected in a same probability from among the plurality of shuffle patterns based on the number of data to be rearranged.

Alternatively, the first to fourth shuffle patterns may be selected in a specified probability from among the plurality of shuffle patterns based on the number of data to be rearranged.

Also, it is desirable that k is a common divisor of m and n. Alternatively, it is desirable that when s is not a common multiple of k, dummy data are added to one of the u groups such that the number of data in the one group is equal to k.

BRIEF DESCRIPTION OF THE DRAWINGS

FIG. 2 is a block diagram showing a specific example of the structure of a first output rearranging unit in the scheduler shown in FIG. 1;

FIG. 3 is a block diagram showing a specific example of the structure of the input rearranging unit in the scheduler shown in FIG. 1;

FIG. 4 is a diagram showing an example of a shuffle pattern for rearranging twelve data;

FIG. 5 is a block diagram showing the structure of a scheduler according to a first embodiment of the present invention;

FIG. 6 is a diagram showing a correspondence relation between input interfaces and output interfaces in the scheduler of the first embodiment;

FIG. 11 is a block diagram showing a pattern stored in a second shuffle pattern storage unit in the scheduler of the first embodiment;

FIG. 12 is a block diagram showing a pattern stored in a third shuffle pattern storage unit in the scheduler of the first embodiment;

FIGS. 13A to 13E are diagrams showing the processing state of the input interface side in a shuffling operation for 8×12 request data in the scheduler of the first embodiment;

FIGS. 14A to 14E are diagrams showing the processing state of the output interface side in the shuffling operation for the 8×12 data in the scheduler of the first embodiment;

FIG. 17 is a block diagram showing a specific example of the structure of the input rearranging unit in the scheduler with the generalized structure;

FIG. 18 is a block diagram showing an example of a shuffle pattern according to a first modification of the present invention;

FIG. 21 is a block diagram showing a specific example of the structure of the input rearranging unit in the second modification of the present invention.

DESCRIPTION OF THE PREFERRED EMBODIMENTS

Figure 1:
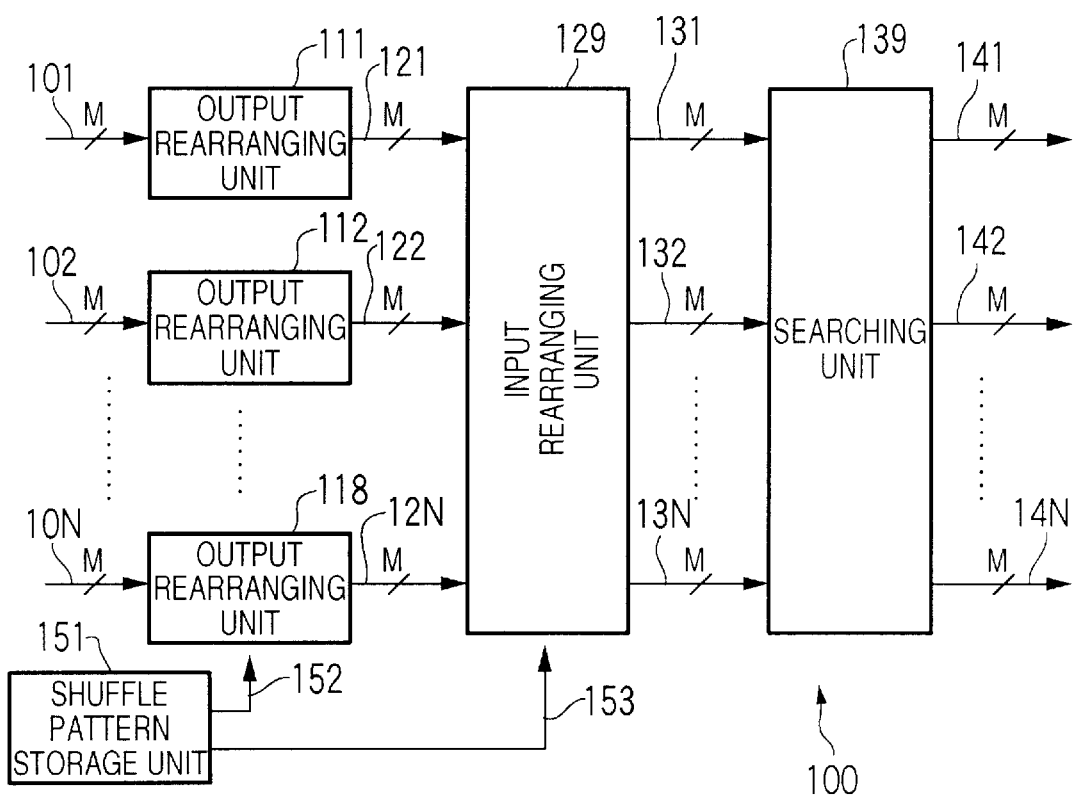
FIG. 1 is a block diagram showing the overview of the structure of a conventional scheduler.

Hereinafter, a scheduler of the present invention will be described below in detail with reference to the attached drawings.

FIG. 5 is a block diagram showing the structure of the scheduler according to the first embodiment of the present invention. The scheduler 200 is an ATM (asynchronous transfer mode) switching apparatus which has 8 input interfaces and 12 output interfaces. The scheduler 200 has an arbitration function to rearranges the request data 201 to 208 outputted from the first to eighth input interfaces to the first to 12 output interfaces. Before the specific example of the structure of the scheduler 200 shown in FIG. 5 will be described, the overview will be described.

FIG. 6 shows a correspondence relation between the input interfaces and the output interfaces. In FIG. 6, the vertical axis shows the first to eighth input interfaces (I/F), and the horizontal axis shows the first to twelfth output interfaces (I/F). In FIG. 6, also, the location with the signal of "1" shows the state which a request from the input interface side to the output interface side is issued. There is no request at the location with the signal of "0".

In FIG. 6, referring to the first output interface, it would be seen that the third and eighth input interfaces issue the request. Referring to the second output interface, the first, third and eighth input interfaces issue the request. Referring to the third output interface, the first and second input interfaces issue the request. That is, these requests compete with each other on the side of the output interface. When such competition occurs, the scheduler 200 carries out the arbitration. In this example, supposing that existence or non-existence of the request is interpreted, a permission (Grant) signal is given to one request every output interface. To fairly carry out the arbitration to each input interface, the respective requests need to be shuffled.

Returning to FIG. 5, the scheduler 200 is composed of the first to eighth output rearranging units 211 to 218, an input rearranging unit 229, a searching unit 239 and a first shuffle pattern storage unit 251. The first to eighth output rearranging units 211 to 218 inputs 8 sets of 12 request data 201 to 208 from 8 input interfaces, respectively. The input rearranging unit 229 inputs 8 sets of 12 rearranged request data 221 to 228 from the first to eighth output rearranging units 211 to 218. Here, the 12 request data are the data to request one output interface every input interface.

The 8 sets of 12 rearranged request data 231 to 238 are supplied from the input rearranging unit 229 to the searching unit 239. The searching unit 239 outputs 8 sets of 12 permission signals 241 to 248. The first shuffle pattern storage unit 251 stores the shuffle patterns to rearrange 8 data and 12 data. One 252 of the shuffle patterns is supplied from the first shuffle pattern storage unit 251 to the first to eighth output rearranging units 211 to 218 and is used for the shuffling operation in units of 12 data. Also, the other shuffle pattern 253 is supplied from the first shuffle pattern storage unit 251 to the input rearranging unit 229, and is used for the shuffling operation in units of 12 data. That is, in the scheduler 200 of the first embodiment, the first output rearranging unit 211 receives 12 request data 201 from the first input interface. The 12 request data correspond to the first to twelve output interfaces. Then, the first output rearranging unit 211 rearranges the 12 request data in accordance with the shuffle pattern 252. The second output rearranging unit 212 receives the 12 request data 202 from the second input interface. Then, the second output rearranging unit 212 rearranges the 12 request data in accordance with the shuffle pattern 252, like the first output rearranging unit 211. The same operation is carried out in the other output rearranging units. For example, the eighth output rearranging unit 218 receives a set of 12 request data 208 from the eighth input interface. Then, the eighth output rearranging unit 218 rearranges the 12 request data in accordance with the shuffle pattern 252.

In this way, the 8 sets of 12 rearranged request data 221 to 228 are outputted from the first to eighth output rearranging units 211 to 218 to the input rearranging unit 229. The input rearranging unit 229 rearranges each of the 8 sets of 12 rearranged request data in accordance with the shuffle pattern 253. The searching unit 239 carries out a searching operation using the 8 sets of 12 rearranged request data 231 to 238 as a search object table. As have been described with reference to FIG. 6, the arbitration is carried out to the competing output interfaces, so that the allocation of the transfer permission is carried out in order.

Figure 7:
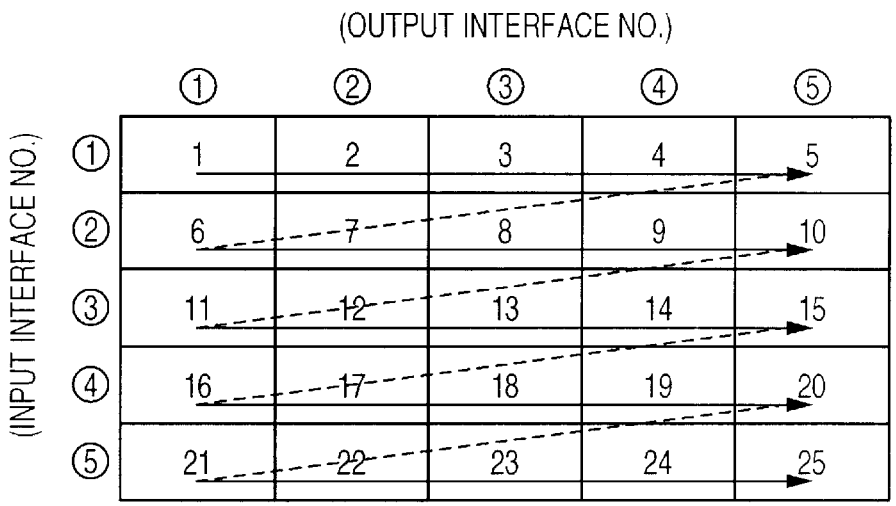
FIG. 7 is s diagram to describe algorithm for a searching operation of a searching unit in the scheduler of the first embodiment.

FIG. 7 is a diagram to describe algorithm for the searching operation by the searching unit 239. In FIG. 7, the vertical axis shows input interface numbers and the horizontal axis shows output interface numbers. To simplify the description, a case of five input interfaces and five output interfaces is shown in FIG. 7.

As seen from FIG. 7, the searching unit 239 shown in FIG. 5 realizes the following algorithm. That is, in the 2-dimensional data, scanning is carried out in a direction from the left to the right in FIG. 7. When reaching the right end, the scanning position is shifted to the following input interface number. Then, the scanning is carried out in the direction from the left to the right in FIG. 7 again. When reaching the right end, the scanning point is shifted to the following input interface number again. In this way, whether existence or non-existence of the request is determined in order from the left to the right and then from the top to bottom. The allocation of the transfer permission is not carried out for the connection between one input interface and one output interface, when a transfer permission from the input interface to another output interface has been already given. Even if a plurality of transfer permissions are given to the input interface, only one datum can be transferred or transmitted at a same time. Therefore, in the present invention, transfer permissions are not given to one input interface unit or one output interface unit at the same time in this way.

This will be described based on a specific example of the FIG. 6. When the scanning operation is carried out in the form like the raster scan of a television as shown in FIG. 7, it would be found that a request corresponding to the second output interface is present in the first input interface. The request is the first one for the first to twelfth output interfaces. Therefore, the reservation of the route from the first input interface to the second output interface is unconditionally carried out. After this, the reservation of the route to the other output interface is not carried out to the first input interface. That is, even if it is found that a request to the third output interface is present in the first input interface in the following searching operation, the reservation of the route is not carried out.

When the searching operation is further carried out in the example shown in FIG. 6, it is found that a request to the third output interface is present in the second input interface. At this point of time, no reservation is carried out to both of the second input interface and the third output interface. Therefore, the reservation of the route linking these interfaces is carried out. Hereinafter, the searching operation of the request and the reserving operation of the route are carried out in the same way. In this way, the scheduler 200 arbitrates 96 (=8×12) requests and selects the routes in which data transfer are permitted. The transfer permissions (Grant) are given to the selected routes.

The data transfer in the apparatus is actually carried out using the switch elements. Therefore, the data cannot be sent at the same time from the same input interface to the plurality of output interfaces. Similarly, one output interface cannot receive data at the same time from a plurality of input interfaces. Therefore, the scheduler 200 carries out the arbitration in such a manner that the transfer permission is not given to the plurality of output interfaces for the same input interface at the same time and such that a plurality of input interfaces do not receive transfer permissions to the same output interface.

It should be noted that a rearranging unit is arranged in the rear stage of the searching unit 239. However, because the rearranging unit is not directly related with the present invention, it is not shown in FIG. 5. This rearranging unit which is not shown is used to recover the original arrangement state through an inverse conversion to the conversion by the first to eighth output rearranging units 211 to 218 and the input rearranging unit 229 using the shuffle patterns. Because the shuffling operation is carried out for the fair allocating operation, the data are returned to the original arrangement state.

Next, a case that the first shuffle pattern storage unit 251 stores the shuffle patterns for rearrangement of four data will be described below.

In this case, the shuffle patterns are calculated by a CPU (central processing unit, not shown) and are stored in the shuffle pattern storage unit 251. In each pattern, the data indicative of "1", "2", "3" and "4" are optionally arranged. In course, the shuffle patterns stored in the shuffle pattern storage unit 251 may be set and stored manually.

Figure 8:
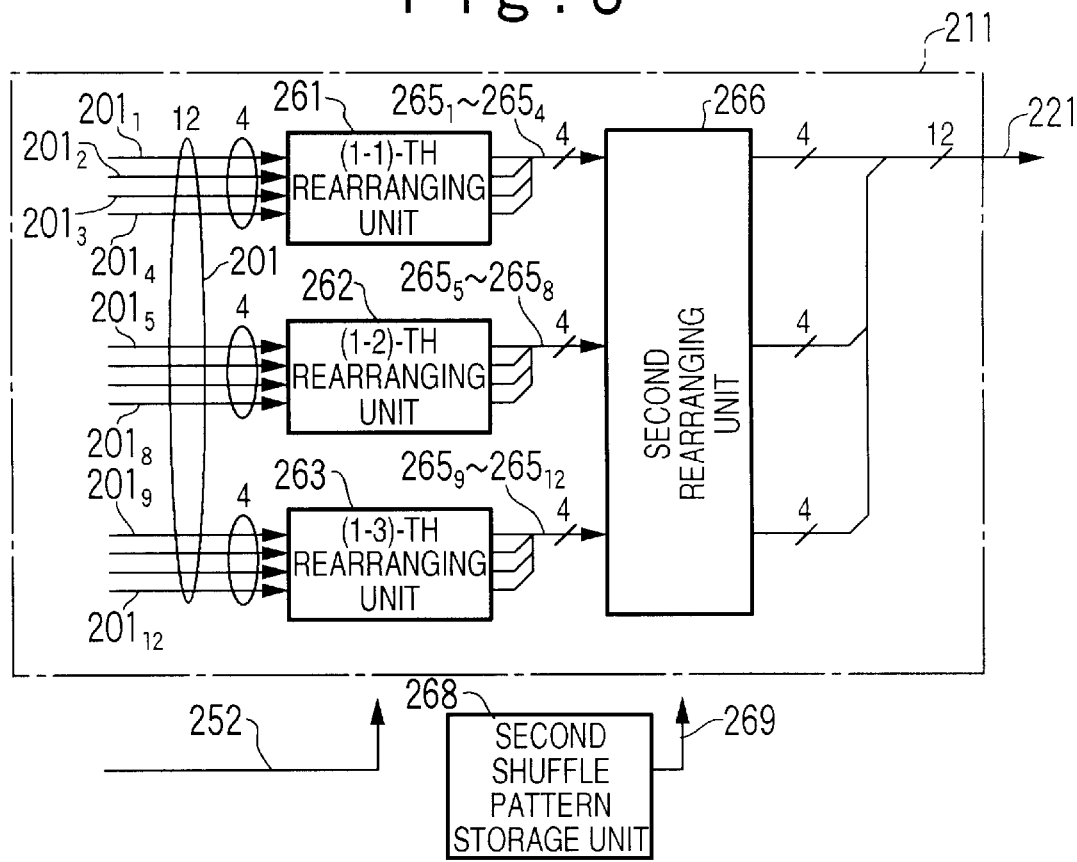
FIG. 8 is a block diagram showing a specific example of the structure of an output rearranging unit in the scheduler of the first embodiment.

FIG. 8 shows a specific example of the structure of the output rearranging unit shown in FIG. 5. Because the first to eighth output rearranging units 211 to 218 have the same structure, the structure of the first output rearranging unit 211 is shown typically. The first output rearranging unit 211 is composed of (1-1)-th to (1-3)-th rearranging units 261 to 263, and a second rearranging unit 266. The (1-1)-th to (1-3)-th rearranging units 261 to 263 input the 12 request data $201_1$ to $201_{12}$ in units of 4 data, respectively. The shuffle pattern 252 is supplied from the first shuffle pattern storage unit 251 shown in FIG. 5 to the (1-1)-th to (1-3)-th rearranging units 261 to 263. The rearrangement of 3 sets of 4 request data 2011 to 2014, 2015 to 2018, 2019 to 20112 is carried out in units of 4 data in accordance with the shuffle pattern by the (1-1)-th to (1-3)-th rearranging units 261 to 263, respectively. The rearranged request data $265_1$ to $265_{12}$ are supplied to the second rearranging unit 266.

The shuffle pattern 269 is supplied from a second shuffle pattern storage unit 268 as a new shuffle pattern storage unit to the second rearranging unit 266. At this time, the rearrangement of the rearranged request data $265_1$ to $265_{12}$ is carried out in units of sets based on the shuffle pattern 269. In this way, the 12 rearranged request data 221 are outputted from the first output rearranging unit 211.

Figures 9, 10:
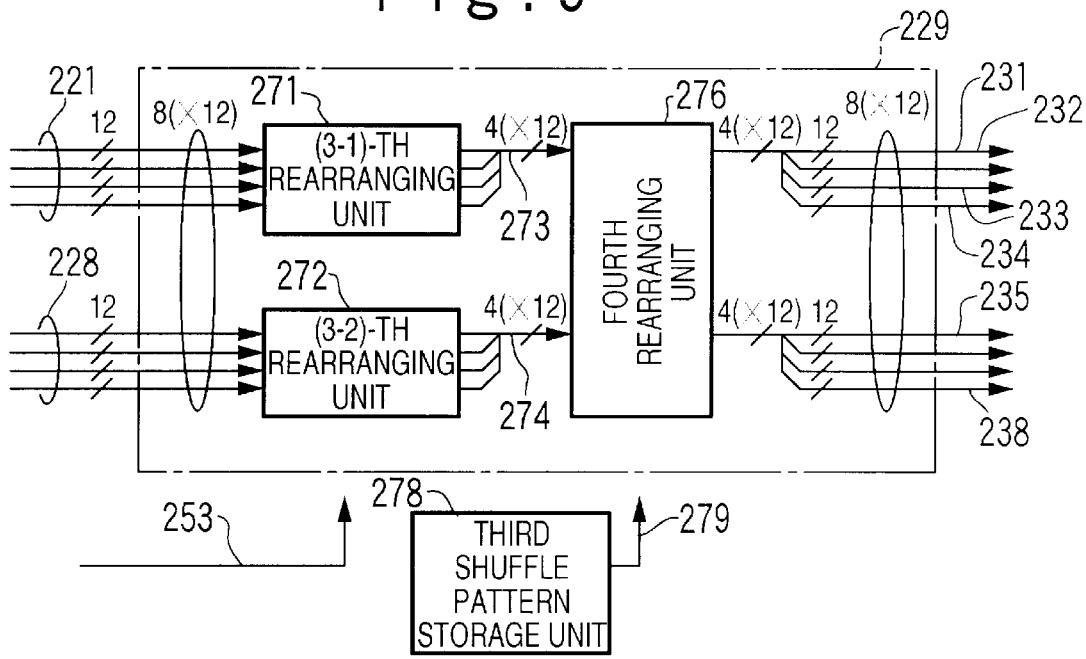
FIG. 9 is a block diagram showing a specific example of the structure of an input rearranging unit in the scheduler of the first embodiment.
FIG. 10 is a block diagram showing a pattern stored in a first shuffle pattern storage unit in the scheduler of the first embodiment.

FIG. 9 shows a specific example of the structure of the input rearranging unit 229 in the scheduler 200 shown in FIG. 5. The input rearranging unit 229 is composed of (3-1)-th and (3-2)-th rearranging units 271 and 272, and a fourth rearranging unit 276. The rearranging units 271 and 272 input the 8 sets of 12 request data 221 to 228 in units of 4 sets from the first to eighth output rearranging units 211 to 218 shown in FIG. 5, respectively. The fourth rearranging unit 276 inputs and rearranges 8 sets of 12 rearranged request data 273 and 274. In this way, the 8 sets of 12 rearranged request data 231 to 238 are supplied to the searching unit 239 shown in FIG. 5.

The shuffle pattern 253 is supplied from the first shuffle pattern storage unit 251 shown in FIG. 5 to the (3-1)-th and (3-2)-th rearranging units 271 and 272 of the input rearranging unit 229. Also, a shuffle pattern 279 is supplied to the fourth rearranging unit 276 from a third shuffle pattern storage unit 278 as a new shuffle pattern storage unit. The shuffle pattern 253 is used to rearrange four sets of 12 rearranged request data by each of the rearranging units 271 and 272. The fourth rearranging unit 276 carries out the rearrangement of 8 sets of 12 rearranged request data 273 and 274. In this case, the third shuffle pattern storage unit 278 is sufficient to store only two kinds of shuffle pattern. Therefore, it is not necessary to prepare an exclusive use memory for the third shuffle pattern storage unit 278 and a part of the memory area may be used for the storage unit 278 or registers may be used for the storage unit 278.

By the way, each of the (1-1)-th to (1-3)-th rearranging units 261 to 263 (FIG. 8) in each of the first to eighth output rearranging units 211 to 218 shown in FIG. 5 rearranges the request data in units of 4 data. Also, each of the (3-1)-th and (3-2)-th rearranging units 271 and 272 (FIG. 9) in the input rearranging unit 229 shown in FIG. 5 rearranges the rearranged request data in units of 4 sets of 12 data. That is, because the unit number of "4" is common to both the cases, the shuffle patterns 252 and 253 can be stored in the same shuffle pattern storage unit. That is, the shuffle patterns to be used can be optionally selected from among a plurality of shuffle patterns stored in the first shuffle pattern storage unit 251.

Also, the shuffle patterns used in the (1-1)-th to (1-3)-th rearranging units 261 to 263 may be the same pattern or different patterns. This is same to the (3-1)-th and (3-2)-th rearranging units 271 and 272 shown in FIG. 9.

FIG. 10 to FIG. 12 show examples of shuffle pattern tables in the shuffle pattern storage unit. FIG. 10 shows a shuffle pattern table stored in the first shuffle pattern storage unit 251. The values of "1", "2", "3" and "4" indicating the numbers of the sets or data are contained in each shuffle pattern. The number of shuffle patterns necessary for rearranging four sets or data shown in FIG. 10 is 24. Therefore, "1" to "24" are given as the numbers of the shuffle patterns.

FIG. 11 shows a shuffle pattern table stored in the second shuffle pattern storage unit 268. The values of "1", "2" and "3" indicating the number of the sets are contained in each shuffle pattern. The number of shuffle patterns necessary for rearranging three sets are 6. Therefore, "1" to "6" are used as the numbers of the shuffle pattern.

FIG. 12 shows a shuffle pattern table stored in the third shuffle pattern storage unit 278. The values of "1" and "2" indicating the number of the sets are contained in each shuffle pattern. The number of shuffle patterns necessary for rearranging two sets are 2. Therefore, "1" and "2" are used as the numbers of the shuffle patterns.

FIGS. 13A to 13E and FIGS. 14A to 14E show the shuffling states in a scheduling operation of 8×12 data. Here, FIGS. 13A to 13E show the shuffling states on the side of the input interface. Also, FIGS. 14A to 14E show the shuffling states on the side of the output interface in correspondence to the side of the input interface. In the stage before rearrangement by the scheduler 200, the arrangements of data in the input interface and the output interface are a physically inputted order, as shown in FIG. 13A and 14A. That is, it is supposed that the scheduler 200 is a switching apparatus having 8 input interfaces and 12 output interfaces. In this case, it is supposed that the request data 201 to 208 of "1" to "8" are respectively outputted from the first to eighth input interfaces, and a first set of request data is composed of "1" to "4" and the second set of request data is composed of "5" to "8". The 12 rearranged request data for the output interfaces are represented by the values from "1" to "12" over the first to third sets, as show in FIG. 14A.

FIG. 14B shows a case that the rearranging operation to request data in a set is carried out in the output rearranging unit using the shuffle pattern of "3, 4, 2, 1" specified by No. 1 of FIG. 10 stored in the first shuffle pattern storage unit 251. In this example, the same shuffle pattern is used in common to the first to third sets. As a result, the order of "3, 4, 2, 1" is attained in the first set, and the order of "5, 6, 7, 8" is converted into the order of "7, 8, 6, 5" in the second set. The order of "9, 10, 11, 12" is converted into the order of "11, 12, 10, 9" in the third set.

Next, the rearrangement between the sets of the rearranged request data is carried out. This is shown in FIG. 14C. It is supposed that the rearrangement is carried out using the pattern of "3, 1, 2" specified by No. 5 of FIG. 11 stored in the second shuffle pattern storage unit 268. In this case, a third set is arranged as a first set, a first set is arranged as a second set, and a second set is arranged as a third set. As a result, the order of "(11, 12, 10, 9), (3, 4, 2, 1), (7, 8, 6, 5)" is attained. When the shuffling operation is carried out between the sets in this way, the arrangement or order of the rearranged request data in the set does not change.

Next, FIG. 13D shows a case where the rearrangement in the set of the rearranged request data is carried out using the shuffle pattern of "2, 4, 1, 3" specified by No. 4 of FIG. 10 stored in the first shuffle pattern storage unit 251. Thus, "1, 2, 3, 4, 5, 6, 7, 8" of the request data 201 to 208 is rearranged into the order of "2, 4, 1, 3, 6, 8, 5, 7".

Last, FIG. 13E sows a case where the rearrangement between the sets of the rearranged request data is carried out using the shuffle pattern of "2, 1" of FIG. 12 stored the third shuffle pattern storage unit 278. Thus, the order of "2, 4, 1, 3, 6, 8, 5, 7" of the request data 201 to 208 is rearranged into the order of "6, 8, 5, 7, 2, 4, 1, 3". In this way, the order of the four kinds of the shuffling operations, namely, the shuffling operation in the set of the output interfaces, the shuffling operation between the sets of output interfaces, the shuffling operation in the set of input interfaces and the shuffling operation between the set of the input interfaces may be changed. However, the same result as shown in FIGS. 13A to 13E and 14A to 14E can be obtained. In addition, when all the shuffle patterns are used in order, it is possible to guarantee the fairness of the allocation through the searching operation after the shuffling operation.

As described above, in this embodiment, 8 kinds of input interfaces and 12 kinds of output interfaces are grouped into groups (each group corresponding to a set of data) in accordance with the greatest common divisor of "4". The 2-stage shuffling operation of the shuffling operation between the groups and the shuffling operation in the group is carried out to each group. Generalizing this, when the shuffling operation is carried out to data having the size of N×M (the value N is different from the value M), these values N and M are grouped based on a common divisor k. The 2-stage shuffling operation of the shuffling operation between the groups and the shuffling operation in the group is carried out to each group.

Figure 15:
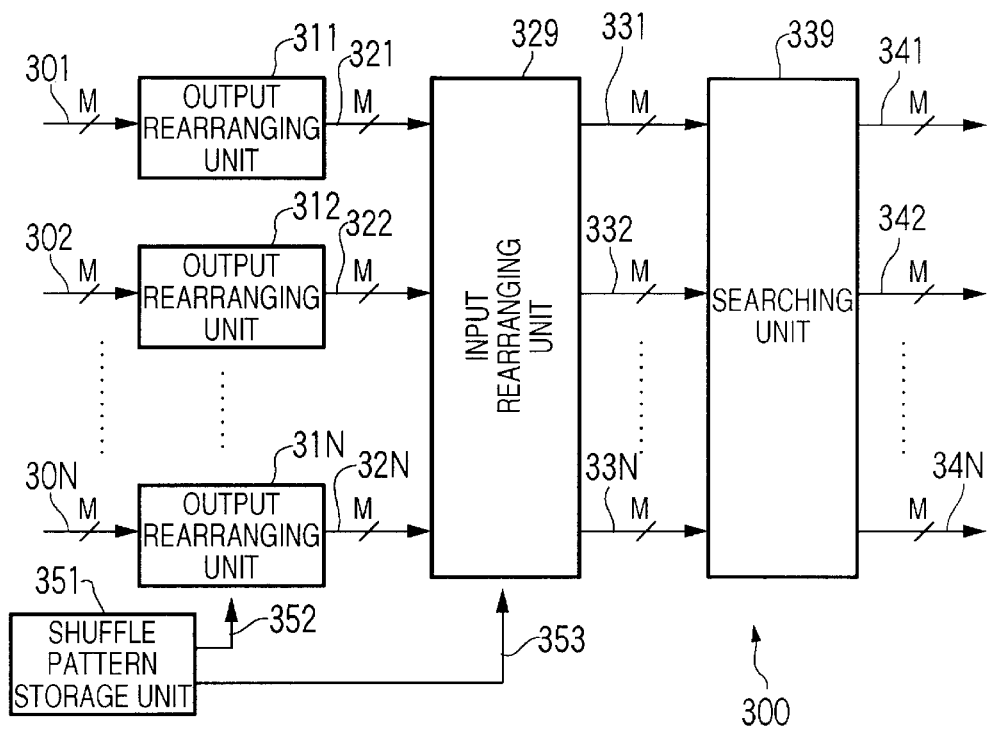
FIG. 15 is a block diagram showing the generalized structure of the scheduler based on the embodiment.

FIG. 15 shows the structure of a generalized scheduler 300. The scheduler 300 is composed of first to N-th output rearranging units 311, 312, . . . , 31N, an input rearranging unit 329, a searching unit 339 and a shuffle pattern storage unit 351. The first to N-th output rearranging units 311, 312, . . . , 31N input the request data 301, 302, . . . , 30N from the input interfaces (not shown). The input rearranging unit 329 inputs the N sets of M request data 321 to 32N rearranged by the first to N-th output rearranging units 311, 312, . . . , 31N in units of M data. Here, the values N and M are positive integers equal to or more than 2 and the value k to be described later is a common divisor between the values N and M.

Also, the first output rearranging unit 311 changes the arrangement of the request data corresponding to the output interfaces and received from the first input interface. The second output rearranging unit 312 changes the arrangement of the request data corresponding to the output interfaces and received from the second input interface. Hereinafter, similarly, the N-th output rearranging unit 31N changes the arrangement of the request data corresponding to the output interfaces and received from the N-th input interface. The input rearranging unit 329 inputs the N sets of M rearranged request data 321 to 32N from the output rearranging units 311 to 31N and rearranges the rearranged request data in units of sets.

The N sets of M data 331 to 33N after rearrangement outputted from the input rearranging unit 329 are supplied to the searching unit 339 and the searching operation similar to the searching operation described above is carried out there. Then, in order, the allocation of the transfer permissions is carried out and N sets of M permission signals 341 to 34N are outputted.

The scheduler 300 is provided with the first shuffle pattern storage unit 351 to output shuffle patterns used to rearrange of k data. One 352 of the shuffle patterns outputted from the first shuffle pattern storage unit 351 is supplied to the first to N-th output rearranging units 311 to 31N and is used for the rearrangement of the request data 301 to 30N in units of k request data. Also, the other shuffle pattern 353 outputted from the first shuffle pattern storage unit 351 to input rearranging unit 329, and is used for the rearrangement of the rearranged request data in units of k sets or groups.

It should be noted that the rearranging unit (not shown) is provided at the rear stage of the searching unit 339, as described in the above description. The rearranging unit is used to recover the original arrangement of the request data through inverse conversion to the conversion by the first to N-th output rearranging units 311, 312, . . . , 31N and the input rearranging unit 329.

Figure 16:
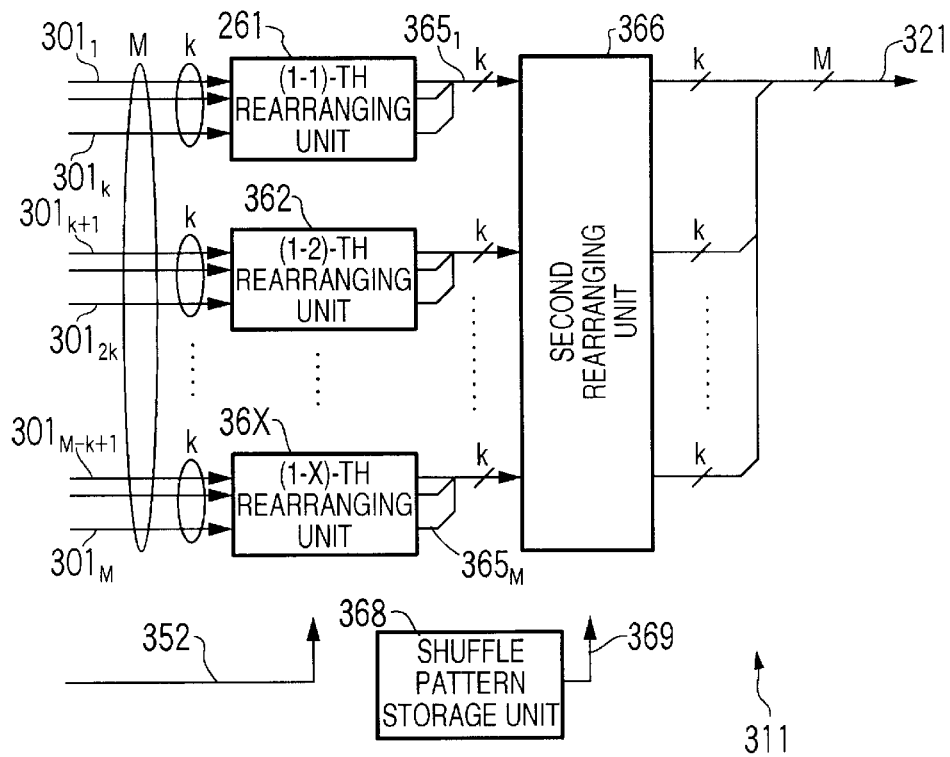
FIG. 16 is a block diagram showing the structure of the output rearranging unit in the scheduler with the generalized structure.

FIG. 16 shows a specific example of the structure of the output rearranging unit. Here, the first output rearranging unit 311 is shown but the second to N-th output rearranging units 312, . . . , 31N have the same structure as the first rearranging unit 311. The circuit structure of the first output rearranging unit 311 is generalized from the circuit shown in FIG. 8 in the above embodiment. That is, the first output rearranging unit 311 is composed of (1-1)-th to (1-X)-th rearranging units 361 to 36X (here, X=M/k) for inputting the M request data (X sets of k request data) $301_1$ to $301_M$, respectively. The shuffle pattern 352 is supplied from the first shuffle pattern storage unit 351 shown in FIG. 15 to the (1-1)-th to (1-X)-th rearranging units 361 to 36X. The rearrangement of the request data $301_1$ to $301_k$, $301_{k+1}$ to $301_{2k}$, $301_{M-k+1}$ to $301_M$ is carried out in units of k data in accordance with the shuffle pattern 352. The rearranged request data $365_1$ to $365_M$ are supplied to the second rearranging unit 366. The shuffle pattern 369 is supplied to the rearranging unit 366 from a second shuffle pattern storage unit 368 as a new shuffle pattern storage unit, and the rearranging operation is carried out based on the shuffle pattern 369 in unit of sets of k data. The request data 321 rearranged in this way are outputted from the first output rearranging unit 311.

FIG. 17 shows a specific example of the structure of the input rearranging unit 329 of the scheduler 300 with the generalized structure shown in FIG. 15. The input rearranging unit 329 is composed of (3-1)-th to (3-Y)-th rearranging units 371, . . . , 37Y and a fourth rearranging unit 376. The (3-1)-th to (3-Y)-th rearranging units 371, . . . , 37Y input N sets of M request data 321 to 32N from the output rearranging units 311 to 31N shown in FIG. 15. Each of the (3-1)-th to (3-Y)-th rearranging units 371, . . . , 37Y carries out the rearranging operation to a set of (M×k (=N/Y)) rearranged request data. The fourth rearranging unit 376 inputs the request data 373, 374, . . . , 37N of Y sets of k×M rearranged request data and carries out the rearranging operation. In this way, the data 331 to 33Y are supplied to the searching unit 339 shown in FIG. 15 in units of k×M rearranged request data.

The shuffle pattern 353 is supplied from the first shuffle pattern storage unit 351 shown in FIG. 15 to the (3-1)-th to (3-N)-th input rearranging units 371 to 37N of the input rearranging unit 329. Also, the shuffle pattern 379 is supplied to the fourth rearranging unit 376 from the third shuffle pattern storage unit 378 as a new shuffle pattern storage unit. The shuffle pattern 353 is used for the rearrangement of Y sets of (k×M) rearranged request data from the (3-1)-th to (3-Y)-th rearranging unit 371 to 37Y. The fourth rearranging unit 376 carries out the rearranging operation of the total Y sets of (k×M) rearranged request data. The (3-1)-th to (3-Y)-th rearranging units 371 to 37Y have the identical structure to each other.

By the way, when the shuffling operation is carried out in the scheduler having N input interfaces and M output interfaces, two memories are required to store shuffle patterns. One of them has the memory capacities shown by the following equation (1) and the other memory has the memory capacity shown by following equation (2) in the conventional scheduler.

$$N! \text{ words} \times N\log_2(N) \text{ bits} \quad (1)$$

$$M! \text{ words} \times M\log_2(M) \text{ bits} \quad (2)$$

On the other hand, in the present invention, the memory is sufficient to have the memory capacities shown by following (3) to (5). Therefore, the memory capacity can be reduced.

$$(N/k)! \text{ words} \times (N/k)\log_2(N/k) \text{ bits} \quad (3)$$

$$(M/k)! \text{ words} \times (M/k)\log_2(M/k) \text{ bits} \quad (4)$$

$$k! \text{ words} \times k\log_2(k) \text{ bits} \quad (5)$$

It should be noted that in the above equations (1) to (5), conditions are set to the variable N, M, and k. The conditions are that these values N, M, and k are multipliers of 2 and that the value k is a common divisor of the values N and M. When not meeting these conditions, the part of the logarithm calculation and the fraction do not become integers. When the values are set not to meet these conditions, it is necessary to carry out the conversion such as rounding of the value of the fractional part into "the minimum integer above the calculated value" or "2 above the value which takes a logarithm multipliers". Also, in case of addition of dummy data, it is necessary to set the values obtained by adding the dummy data to the values N and M to the values N and M in the case of calculation of the above equations.

FIG. 18 shows an example of the first modification of the shuffle pattern in the present invention. Such a shuffle pattern 411 is the shuffle pattern provided in place of the shuffle pattern stored in the first shuffle pattern storage unit 251 (see FIG. 10). In such four kinds of shuffle pattern 411, a probability that "1" has a highest priority is "½". Also, the probability that "2" or "3" has the highest priority is ¼. Moreover, the probability that "2" or "1" has the lowest priority is "¼", and the probability that "3" has the lowest priority is "½". Therefore, the priority levels becomes the order of "1", "2", and "3" statistically.

In this case, there is shown the shuffle pattern 411 used when the rearranging operation to request data in the group is carried out in the first to eighth output rearranging units 211 to 218 shown in FIG. 5. However, in the same way, it is possible to control the third shuffle pattern storage unit 278 (FIG. 12) of the input rearranging unit 229.

If all possible kinds of shuffle patterns are prepared, the probability of each shuffle pattern to be placed in the highest priority level is equal to each other over all the kinds of patterns. In the same way, the probability of each shuffle pattern to be allocated for the next highest priority is also equal to each other over all the kinds of patterns. In the embodiments, all the kinds of shuffle pattern are not prepared. That is, a part of all the kinds of shuffle pattern is used in some case, and a plurality of shuffle patterns which are same are stored in another case. Thus, the priority levels between the groups are controlled freely. For example, it is possible to make the probability of a specific group statistically higher than the other groups.

In the above description of the embodiments and the general scheduler based on this, the value k is a common divisor between the values N and M. However, such a presupposition is not always needed.

Figure 19:
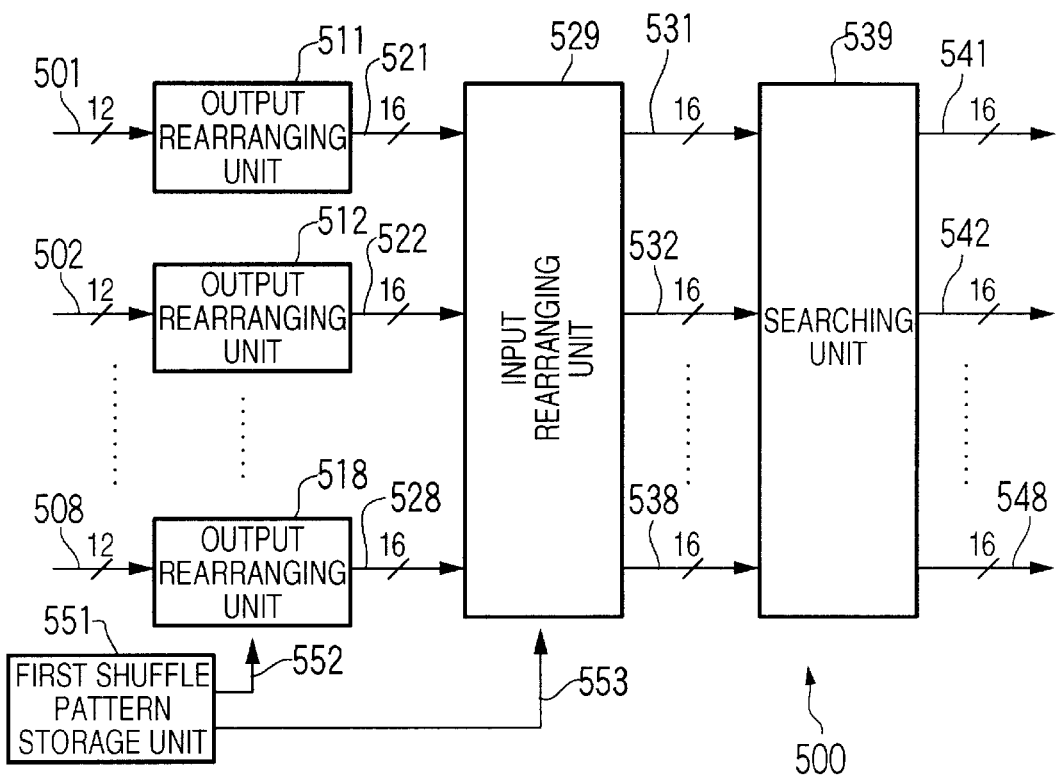
FIG. 19 is a block diagram showing the whole structure of the scheduler according to a second modification of the present invention.

FIG. 19 shows the structure of the scheduler in the second modification. In FIG. 19, the same components as those of FIG. 5 are allocated with the same reference numerals, and the description of these components will be omitted. For example, in this second modification, a scheduler 500 is an ATM switch having eight input interfaces and sixteen output interfaces.

The scheduler 500 is composed of first to eighth output rearranging units 511 to 518, an input rearranging unit 529, a searching unit 500 539 and a first shuffle pattern storage unit 551. The first to eighth output rearranging units 511 to 518 input 8 sets of 12 request data 501 to 508 outputted from eight input interfaces (not shown), respectively. The input rearranging unit 529 inputs 8 sets of 16 rearranged request data 521 to 528 from the first to eighth output rearranging units 511 to 518. In this case, 8 sets of 16 request data 501 to 508 are the data to request output interfaces for every input interface, respectively.

The 8 sets of 16 rearranged request data 531 to 538 are supplied from the input rearranging unit 529 to the searching unit 539 and 8 sets of 16 permission signals 541 to 548 are outputted. The first shuffle pattern storage unit 551 is provided for the scheduler 500 to store the shuffle patterns to rearrange the request data. One 552 of the shuffle patterns is supplied to the first to eighth output rearranging unit 511 to 518 and is used for the rearrangement of 8 sets of 16 request data 201 to 208. Also, the other shuffle pattern 553 outputted from the first shuffle pattern storage unit 551 is supplied to the input rearranging unit 529, and is used for the rearrangement of the 8 sets of 16 rearranged request data. The 8 sets of 16 rearranged request data 531 to 538 outputted from the input rearranging unit 529 are supplied to the searching unit 539 and the 8 sets of 16 permission signals 541 to 548 are outputted.

Figure 20:
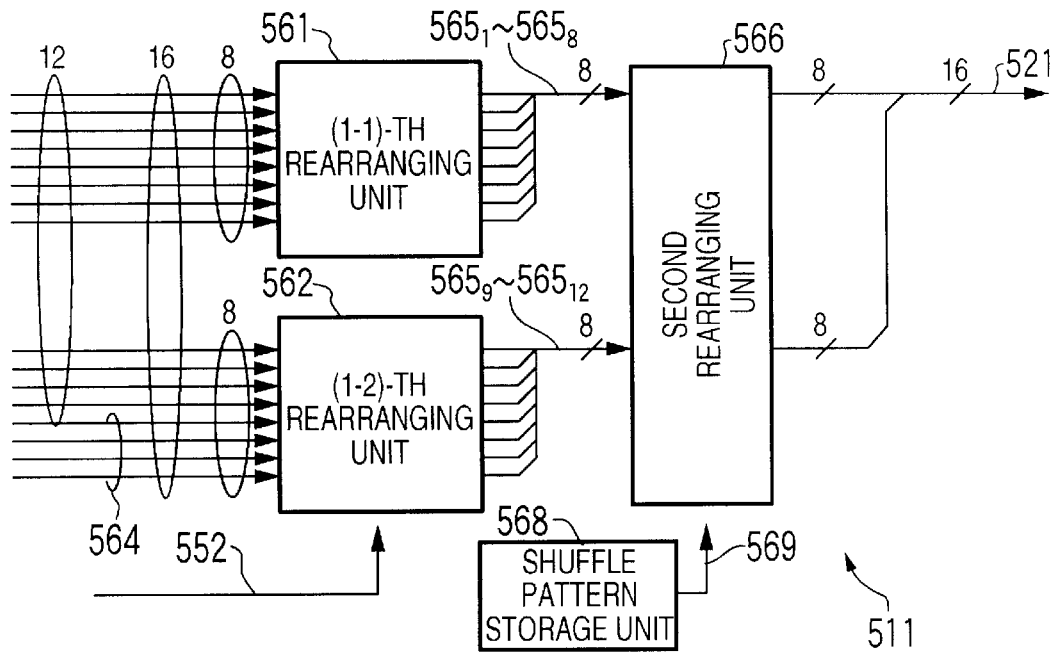
FIG. 20 is a block diagram showing a specific example of the structure of the output rearranging unit in the second modification of the present invention.

FIG. 20 shows a specific example of the structure of the output rearranging unit shown in FIG. 19. The first to eighth output rearranging units 511 to 518 has the same structure. Therefore, the structure of the first output rearranging unit 511 is shown as a typical structure. The first output rearranging unit 511 is composed of (1-1)-th and (1-2)-th rearranging units 561 and 562, which input 12 request data $201_1$ to $201_{12}$ in units of sets of 8 request data. In this case, because the 12 request data are supplied, only four request data are present in the second set. For this reason, four dummy data 564 may be added for the second set. In this case, however, the four dummy data 564 are the data having no request.

The shuffle pattern 552 is supplied to the (1-1)-th and (1-2)-th rearranging units 561 and 562 from the first shuffle pattern storage unit 551 shown in FIG. 19. The rearrangement of the inputted request data (or added dummy data) is carried out in accordance with the shuffle pattern 552. The rearranged request data $565_1$ to $565_{16}$ are supplied to a second rearranging unit 566.

The shuffle pattern 569 is supplied to the second rearranging unit 566 from the second shuffle pattern storage unit 568 as a new shuffle pattern storage unit. For this time, the rearrangement of the 16 rearranged request data is carried out in units of sets of 8 data based on the shuffle pattern 569. The request data 521 rearranged in this way is outputted from the second output rearranging unit 566. The four dummy data 564 are the data having no request. Therefore, even if the dummy data are arranged in the positions for the higher priority levels than the effective request data, there is no influence to the allocation of the effective request data.

FIG. 21 shows a specific example of the structure of the input rearranging unit in the scheduler shown in FIG. 19. The input rearranging unit 539 is composed of a rearranging unit 571 which inputs 8 sets of 16 rearranged request data 521 to 528 from the first to eighth output rearranging units 511 to 518 shown in FIG. 19 at a time. In this case, because there is only one group, the rearrangement of the groups is unnecessary. The shuffle pattern 553 is supplied to the rearranging unit 571.

In the searching unit 539 shown in FIG. 19, the allocation of the transfer permissions of 8×16 is carried out. The 8 sets of 16 permission signals 541 to 548 are returned to the arrangement in accordance with the original interface numbers in a rear-stage circuit (not shown). At this point of time, the permission signals for the dummy data 564 which have been inserted in the (1-2)-th rearranging unit 562 of FIG. 20 are removed.

As described above, even when the value k is not a common divisor of between the values N and M, the rearranging operation can be carried out in the same way as the case that the value k is a common divisor of between the values N and M, by adding the dummy data such that the values N and M after addition of the dummy data are common multiples of the value k.

It should be noted that in the above embodiments, the reading operation of the shuffle patterns from the shuffle pattern storage unit is presupposed to be equal to each other. However, priority levels can be provided for the input interfaces. In such a case, a shuffle pattern output control unit may be provided to control the number of time of the supply of each shuffle pattern in accordance with the priority levels.

Also, in the above description, 2-dimensional shuffling operation in the scheduler is described. However, the present invention is not limited to the case of 2-dimensional shuffling operation. The present invention is applicable to the shuffling operation in 3-dimension or more. Further, the two-step shuffling operation of the shuffling operation in the group and the shuffling operation between the groups is described. However, the number of steps in the shuffling operation may be increased.

In addition, the dummy data may be added to not one set or group but a plurality of sets or groups.

As described above, according to the present invention, the size of the shuffle pattern can be made the small, so that the necessary capacity of the memory storing the shuffle pattern can be greatly reduced.

What is claimed is:

1. A scheduler having m input interfaces and n output interfaces in an ATM switching apparatus, each of m and n being an integer equal to or more than 2, comprising:

a storage unit which stores a plurality of shuffle patterns including first to fourth shuffle patterns;

a first rearranging section which carries out a first shuffling operation in units of k data (k is an integer equal to or more than 2 and less than or equal to s which is one of n and m, the other being t) and a second shuffling operation in units of u groups (u is an integer equal to or more than 2 and corresponding to s/k) to (m×n) data supplied from said m input interfaces based on said first and second shuffle patterns to produce first rearranged data, said (m×n) data being grouped into (t×u) groups;

a second rearranging section which carries out a third shuffling operation in units of p data (p is an integer equal to or more than 2 and less than or equal to (m×n)) and a fourth shuffling operation in units of groups to said first rearranged data based on said third and fourth shuffle patterns to produce second rearranged data, said first rearranged data being grouped into v groups (v is an integer equal to or more than 2 and corresponding to (m×n)/p);

a control unit which reads out said first to fourth shuffle patterns to supply to said first and second rearranging sections;

a searching unit which outputs a permission signal for a relation between one input interface and one output interface based on said second rearranged data and a predetermined algorithm.

2. The scheduler according to claim 1, wherein said storage unit includes a plurality of memories, which stores said plurality of shuffle patterns in units of sizes of said plurality of shuffle patterns.

3. The scheduler according to claim 1, wherein said first rearranging section includes:

(t×u) rearranging sections, each of which carries out said first shuffling operation to corresponding ones of said (m×n) data based on said first shuffle pattern to produce third rearranged data; and t third rearranging sections, each of which is provided for u of said (t×u) rearranging sections to carry out said second shuffling operation to corresponding u groups of said third rearranged data based on said second shuffle pattern to produce (said first rearranged data)/t.

4. The scheduler according to claim 1, wherein said first rearranging section includes:

t third rearranging sections, each of which is provided to carry out said second shuffling operation to corresponding u groups of said (t×u) groups based on said second shuffle pattern to produce fourth rearranged data; and (t×u) rearranging sections, each of which carries out said first shuffling operation to corresponding one of (said fourth rearranged data)/u based on said first shuffle pattern to produce (said first rearranged data)/(t×u).

5. The scheduler according to claim 1, wherein said second rearranging section includes:

v fifth rearranging sections, each of which carries out said third shuffling operation to corresponding p data of said first rearranged data based on said third shuffle pattern to produce fifth rearranged data; and a sixth rearranging section which carries out said fourth shuffling operation to said v fifth rearranged data based on said fourth shuffle pattern to produce said second rearranged data.

6. The scheduler according to claim 1, wherein said first rearranging section includes:

a sixth rearranging section which carries out said fourth shuffling operation to said first rearranged data based on said fourth shuffle pattern to produce said sixth rearranged data; and v fifth rearranging sections, each of which carries out said third shuffling operation to corresponding data of (said sixth rearranged data)/v based on said third shuffle pattern to produce (said second rearranged data)/v.

7. The scheduler according to claim 1, wherein said control unit allocates ones selected in a same probability from among said plurality of shuffle patterns stored in said storage unit based on the number of data to be rearranged as said first to fourth shuffle patterns.

8. The scheduler according to claim 1, wherein each of said plurality of shuffle patterns has a priority level, and said control allocates ones selected in a specified probability from among said plurality of shuffle patterns based on the number of data to be rearranged as said first to fourth shuffle patterns.

9. The scheduler according to claim 1, wherein said k is a common divisor of said m and n.

10. A scheduler according to claim 1, wherein when s is not a common multiple of k, dummy data are added to at least one of said u groups such that the number of data in said one group is equal to k.

11. The scheduler according to claim 1, wherein when said k is not a common divisor of said m and n, dummy data are added to at least one of said u groups such that said k is a common divisor of said m and n.

12. A method of shuffling (m×n) in a scheduler having m input interfaces and n output interfaces, each of m and n being an integer equal to or more than 2, comprising:
   (a) carrying out a first shuffling operation in units of k data (k is an integer equal to or more than 2 and less than or equal to s which is one of n and m, the other being t) and a second shuffling operation in units of u groups (u is an integer equal to or more than 2 and corresponding to s/k) to (m×n) data supplied from said m input interfaces based on said first and second shuffle patterns to produce first rearranged data, said (m×n) data being grouped into (t×u) groups;
   (b) carrying out a third shuffling operation in units of p data (p is an integer equal to or more than 2 and less than or equal to (m×n)) and a fourth shuffling operation in units of groups to said first rearranged data based on said third and fourth shuffle patterns to produce second rearranged data, said first rearranged data being grouped into v groups (v is an integer equal to or more than 2 and corresponding to (m×n)/p); and
   outputting a permission signal for a relation between one input interface and one output interface based on said second rearranged data and a predetermined algorithm.

13. The method according to claim 12, wherein a plurality of shuffle patterns are stored in units of sizes of said plurality of shuffle patterns.

14. The method according to claim 12, wherein said (a) carrying out includes:
   (c) carrying out said first shuffling operation to said (m×n) data in units of k data based on said first shuffle pattern to produce a third rearranged data; and
   (d) carrying out said second shuffling operation to said third rearranged data in units of u groups based on said second shuffle pattern to produce said first rearranged data.

15. The method according to claim 12, wherein said (a) carrying out includes:
   (e) carrying out said second shuffling operation to said (m×n) data in units of u groups based on said second shuffle pattern to produce said fourth rearranged data; and (f) carrying out said first shuffling operation to said fourth rearranged data in units of k data based on said first shuffle pattern to produce said first rearranged data.

16. The method according to claim 12, wherein said (b) carrying out includes:
   (g) carrying out said third shuffling operation to said first rearranged data in units of p data based on said third shuffle pattern to produce fifth rearranged data; and
   (h) carrying out said fourth shuffling operation to said fifth rearranged data based on said fourth shuffle pattern to produce said second rearranged data.

17. The method according to claim 12, wherein said (b) carrying out includes:
   (i) carrying out said fourth shuffling operation to said first rearranged data in units of groups based on said fourth shuffle pattern to produce sixth rearranged data; and
   (j) carrying out said third shuffling operation to said sixth rearranged data in units of p data based on said third shuffle pattern to produce said second rearranged data.

18. The method according to claim 12, wherein said first to fourth shuffle patterns are selected in a same probability from among said plurality of shuffle patterns based on the number of data to be rearranged.

19. The method according to claim 12, wherein said first to fourth shuffle patterns are selected in a specified probability from among said plurality of shuffle patterns based on the number of data to be rearranged.

20. The method according to claim 12, wherein said k is a common divisor of said m and n.

21. The method according to claim 12, wherein when s is not a common multiple of k, dummy data are added to one of said u groups such that the number of data in said one group is equal to k.

22. The method according to claim 12, wherein when said k is not a common divisor of said m and n, dummy data are added to at least one of said u groups such that said k is a common divisor of said m and n.

* * * * *